A. Miller.
Seed Planter.
No. 29,653. Patented Aug. 14, 1860.
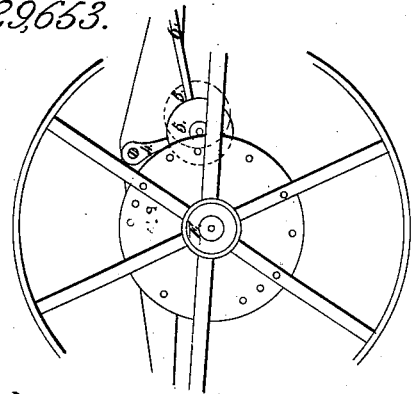
Fig. 2.
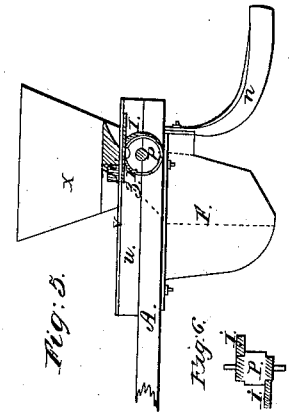
Fig. 5.
Fig. 6.
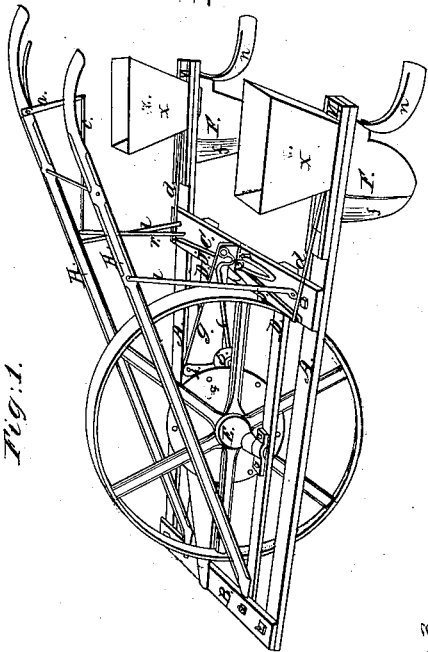
Fig. 1.
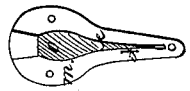
Fig. 4.
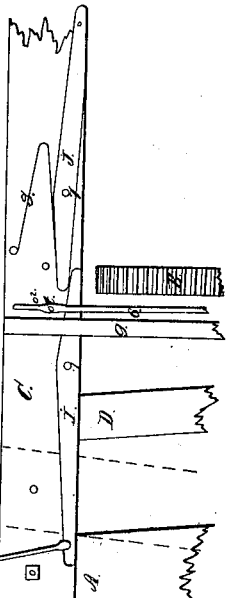
Fig. 3.
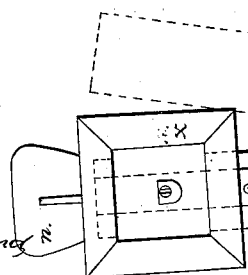
Witnesses:
Truman Richmond
Thomas E. Berkley
Inventor,
Aaron Miller

UNITED STATES PATENT OFFICE.

AARON MILLER, OF BROCKPORT, NEW YORK, ASSIGNOR TO HIMSELF, G. B. WHITESIDE, G. F. BARNETT, AND I. M. LANE, OF SAME PLACE.

IMPROVEMENT IN CORN-PLANTERS.

Specification forming part of Letters Patent No. 29,653, dated August 14, 1860.

*To all whom it may concern:*

Be it known that I, AARON MILLER, of Brockport, county of Monroe, and State of New York, have invented new and useful Improvements in Corn and Bean Planters; and I do hereby declare that the following is a full, clear, and exact description of the construction and operation of the same, reference being had to the annexed drawings, making a part of this specification, in which—

Figure 1 is a perspective view; Fig. 2, a view of the wheel on which the forward part of the machine rests, showing the disk or rim thereon, the pins in the same, and the friction-wheel which gives motion to the distributers. Fig. 3 is a horizontal view of a section of the frame and of the levers that communicate motion from the wheel to the distributers; Fig. 4, a view of the upper part of the teeth, showing the form where they bolt onto the frame. Fig. 5 is a longitudinal elevation through one of the grain-boxes, the distributer, the tooth, and the coverer, showing the relative position of these parts, and Fig. 6 a view of the roller in the distributers, showing its form and the straps that operate it.

The side pieces of the frame A A are about four feet eight inches long, five inches wide, and one and a half inch thick. Inside of these pieces, and about six inches from them, are placed the parallel pieces D D, which are about three and a half feet long, three inches broad, and two inches thick. The cross-piece B, being about three feet three inches long, four inches wide, and one and a half thick, is bolted onto the forward ends of these pieces. The cross-piece C is made a little longer than the forward cross-piece, B, and is five inches wide, and is one and a half inch thick, and is bolted across the rear ends of the pieces D D and to the side pieces, A A, at the point where it intersects them, making these side pieces diverge slightly as they extend backward. The wheel E, which is about two feet three inches in diameter, made in the usual way, has the bearing of its axle-tree about midway on the pieces D. The handles H H are bolted near the forward end of the pieces D D, and extend backward, and are raised to a convenient height and spread to a suitable distance apart and supported there by a brace attached to each of them, *t t*, and running down onto the cross-piece C. These handles extend as far back as the rear ends of the side pieces, A A. The piece *g* is five inches wide near the center, one and a half inch thick, cut down on the upper edge at the back end to about three inches wide and the front end to one and a half inch wide, and is cut out on the under edge, at the center, enough to pass over the hub of the wheel E, and at the rear end to admit of the lever *j* to play on the forward edge of the cross-piece C, and is bolted to the cross-pieces B and C near the side of the wheel. The disk *q*, (or it may be a rim,) made of iron, about ten inches in diameter, is fastened to the spokes of the wheel E. There are holes near the outer edge of this rim or disk for the insertion of iron pins, so arranged that the circle can be divided into six, five, four, three, or two equal parts. The small iron hanger 4, Fig. 1, is about six inches long, one and a half broad, and three-eighths thick, is bolted at the top end to the side of *g*, near its upper edge, and nearly opposite the rear edge of disk *q*, and plays freely on the bolt. On the lower end of this hanger there is a stud or pin projecting out toward the wheel E. On this stud is placed the friction-wheel 5 and the forward end of the connecting-rod 6. The levers *j j* are about one foot seven inches long, having their fulcrums attached to the cross-piece C at 7 7, Fig. 3. The fulcrums are about one foot apart and of equal distance from the sides of the machine. These levers, where they meet in the center of the machine, lap by each other, the one on the right-hand side being forward of the other. There is a hole, *t*, in the rear end of the rod 6, that may be slipped onto a hook in the back side of the right-hand lever *j*, Fig. 3. To the outer ends of the levers *j j* are attached the forward ends of the rods *d d*, the rear ends of which are attached to the distributing-slides *v v*.

The pieces *u u*, Fig. 1, are about fourteen inches long, one and a fourth inch thick, and the same width as the side pieces, A A, to the top of which they are fastened at their rear ends. These pieces *u u* are recessed out on top their whole length about one-fourth inch deep and two and a half inches wide. In these recesses are placed the iron slides *v v*. These slides have a hole in each of them near their rear ends, directly under which are holes down through *u u* and A A large enough to receive the roller P, Fig. 6, and leave a space in front of it, as shown by the dotted line 3, Fig. 5. The center part of these rollers is about two inches in diameter and about one and a half inch long. The sections at each end are about one and five-eighths inch diameter to make room for the straps $i\ i$, which are about one-half inch wide. Outside of these straps the rollers are turned down to about three-fourths of an inch in diameter to form bearings for the rollers. One end of the straps $i\ i$ is attached to the roller, so that the straps wind part way around the rollers in opposite directions, as shown at Fig. 6. The other ends of these straps are attached to the slide $v$, so that the rollers are rolled in either direction as the slide is moved lengthwise. There is a cavity in the roller corresponding exactly in size to the hole in the slide $v$, and so adjusted that when the slide is carried back to the extreme point the holes exactly meet and together form the cavity or cup for measuring out the quantity of seed to be dropped in a place. The cavity in the roller has a screw in the bottom for the purpose of varying the quantity of seed it will hold by turning the screw to the right or left. This arrangement prevents the possibility of the distributers cutting or injuring the seed and makes it certain that the desired amount can be dropped every time. The teeth F F are of cast-iron, the rear part of which is hollow as far forward as the dotted line $e$, Fig. 5. Front of that line it is a sharp cutter-edge angling backward from the top to the ground, and curving more and more backward as it reaches the lowest point, in order to prevent grass, fibrous roots, sods, and the like from accumulating in front of it and being drawn along in the furrow and under the hollow part of the tooth, on which the seed will fall, and in that case be strewed along instead of being left in separate hills, which difficulty is always found to exist when the front part of the tooth stands perpendicular, or angles forward as it reaches the ground, or is straight. The teeth are open in the rear up about three-fourths of the distance from the ground to the top of the tooth. From the top of this opening to the top of the tooth it projects back about an inch. To this projecting part the coverers $n\ n$ are fastened by a bolt which passes through a slot in this projecting part and is capable of being moved up or down to give the seed the required depth of covering and gage the depth the teeth will penetrate the ground. These teeth are about eight inches high, nine in width from front to rear, and about two inches thick near the rear of the hollow part, forming a kind of wedge shape toward the front edge, as shown by the shaded part of Fig. 4, the hollow part $o$, extending to $e$, being about five inches from front to rear, and $f$ being the cutter-edge and $m$ a flange around the top end of the tooth, through which it is bolted to the side pieces, A A.

The machine is drawn by a horse attached to thills, which are connected to the forward end of the machine by hinge-joints, allowing them to play freely up and down. Thus arranged, the machine rests upon three points—the wheel in the forward part and the two teeth under the rear—which causes the teeth to keep in the ground uniformly, however the surface or whatever obstructions the wheel may encounter. This is a circumstance of the greatest importance in planters.

On the pieces $u\ u$ are placed the seed-boxes X X, with the forward edge of the orifice in their bottoms coming just to the forward edge of the hole in the slides when they are back to the extreme point. At the forward edge of the holes in the bottom of the boxes there is a brush, K, Fig. 5, extending down to the slides. When the holes in the slides are carried back of these brushes the cup or cavity formed by the hole in the slides and rollers is filled with the seed in the boxes. Then as the slides are moved forward the holes in them are carried under the brushes and the rollers roll forward, allowing the seed to settle down through the slides by the time the holes are covered by the brushes, and as the rollers roll on and turn the cavities in them nearly bottom side up the seed falls out through the teeth to the ground without being pressed into those cavities so tightly as to remain there and stop the distribution of seed, as is often the case where a cylinder or roller is used alone. Nor can the seed be caught by the corner of the slide as it passes over other holes and cut or mashed, so as to injure its vitality, as is often the case when a slide is used alone or two slides used together, one or the other of these difficulties being found to exist with all other distributers to a greater or less extent. Motion is communicated to the slides from the wheel E on this wise: The spring S, acting upon the levers $j\ j$, throws the slides back and throws the friction-wheel 5 forward partly over the pins in the disk $q$. As the wheel rolls these pins come in contact with the friction-wheel 5 and force it backward, which draws the slides forward. The pin passes the friction-wheel, and the spring brings the slides back again. If the wheel is two feet three inches in diameter and six pins are used, it will drop the hills once in fourteen inches. If five pins are used, they will be once in about seventeen inches; if four pins, twenty-one inches; if three pins, twenty-eight inches; if two pins, forty-two inches; if one pin, eighty-four inches. The distance between the rows may be varied by shifting the side pieces, A A, in or out and passing the bolts through different holes near the outer ends of the cross-pieces B and C.

This machine is also provided with an arrangement for dropping the seed at the will of the operator, independent of the motion of the ground-wheel E. This is effected by raising the rear end of the connecting-rod 6 from its connection with the levers $j\ j$ and drawing it back and slipping it onto the pin 2, (seen at Fig. 3,) which will bring the friction-wheel 5 so far back that it will not come in contact with the pins in the disk $q$. This leaves the levers $jj$ and slides $v\,v$ free to be operated by the hand-lever $a$ on the right-hand handle. This lever $a$, Fig. 1, is crooked, the two arms being nearly of equal length, and standing at nearly right angles to each other is attached to the under side of the right handle, a little forward of where the handle is taken hold of by the hand, the back end of it being directly under the part of the handle clasped by the hand and about one and a half inch from it. The other end of this lever extends downward, to which is attached the rear end of rod $c$, Fig. 1, the forward end being attached to the upper end of the reciprocating lever $r$, which is attached to the brace $l$ of the right-hand handle, where it has its fulcrum, the lower end of lever $r$ being connected to the right-hand lever $j$ near its outer end. As the rear end of lever $a$ is pressed up to the handle the slides $v\,v$ are drawn forward and the seed discharged through the teeth. When the distributers are operated by the wheel E the discharge of seed can be suspended by grasping the handle and lever $a$ and pressing them together. This should always be done while turning round at the end of the rows, and the rear end of the machine raised up so as to clear the teeth from the ground.

When it is desired to plant a field in rows both ways, first mark it out one way at proper distances for the rows. Then, with the rear end of the rod 6 on the pin 2, proceed to plant across the marks, operating the hand-lever $a$ by bringing it up to the handle suddenly as the teeth come on the marks, which will leave the hills in checks or rows both ways.

What I claim as my invention, and desire to secure by Letters Patent, is—

The arrangement of the slides $v$, rollers P, levers $a\,r\,j\,j$, rods $c$ 6 $d\,d$, and wheel E, as described, for the purposes specified.

AARON MILLER.

Witnesses:
    THOMAS E. BERKLEY,
    TRUMAN RICHMOND.